Oct. 30, 1928.
W. F. MacGREGOR
1,689,443
COMBINATION COTTON HARVESTER
Filed March 22, 1927   2 Sheets-Sheet 1
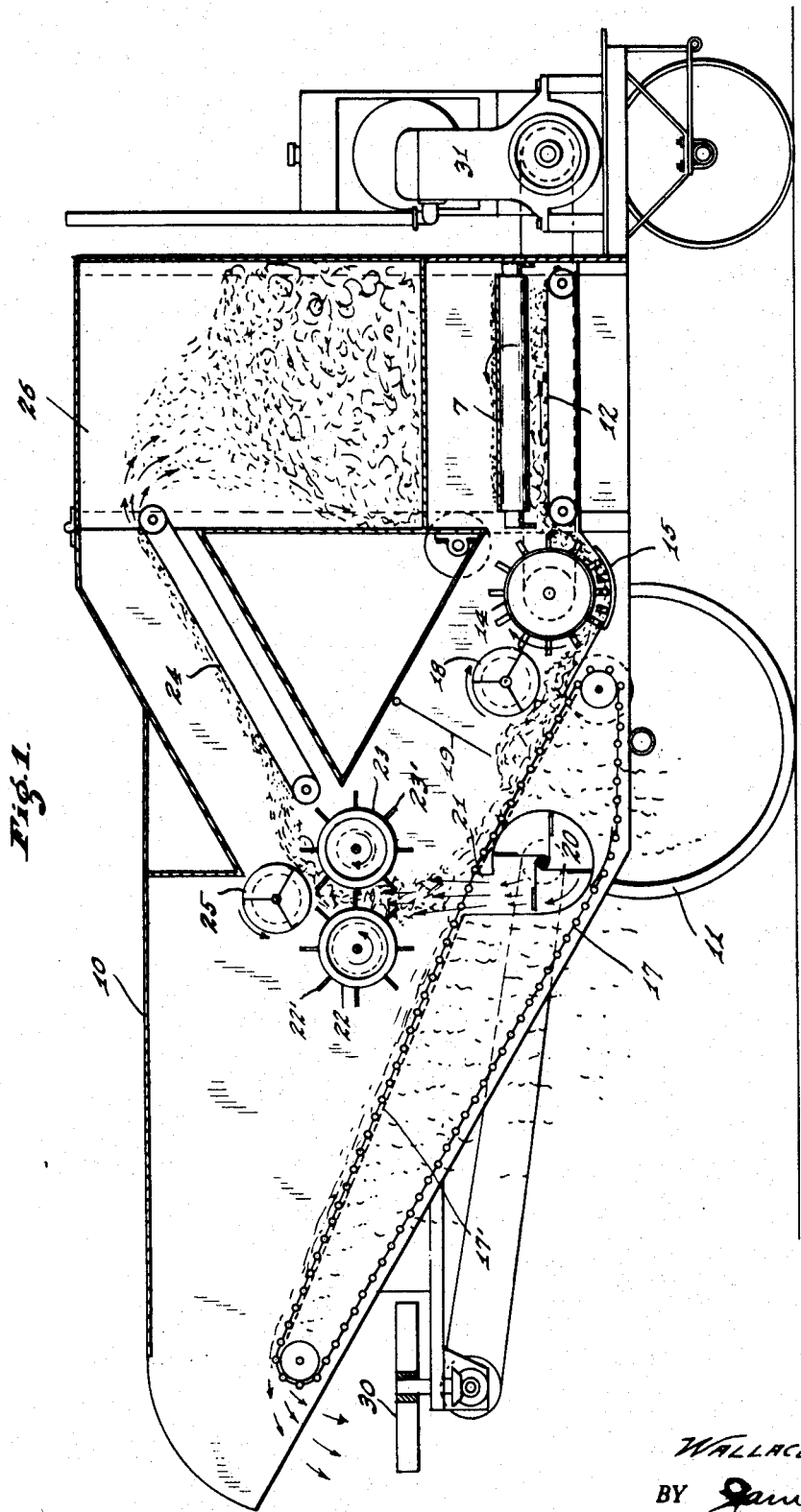
INVENTOR.
WALLACE F. MacGREGOR,
BY James A. Walsh
ATTORNEY

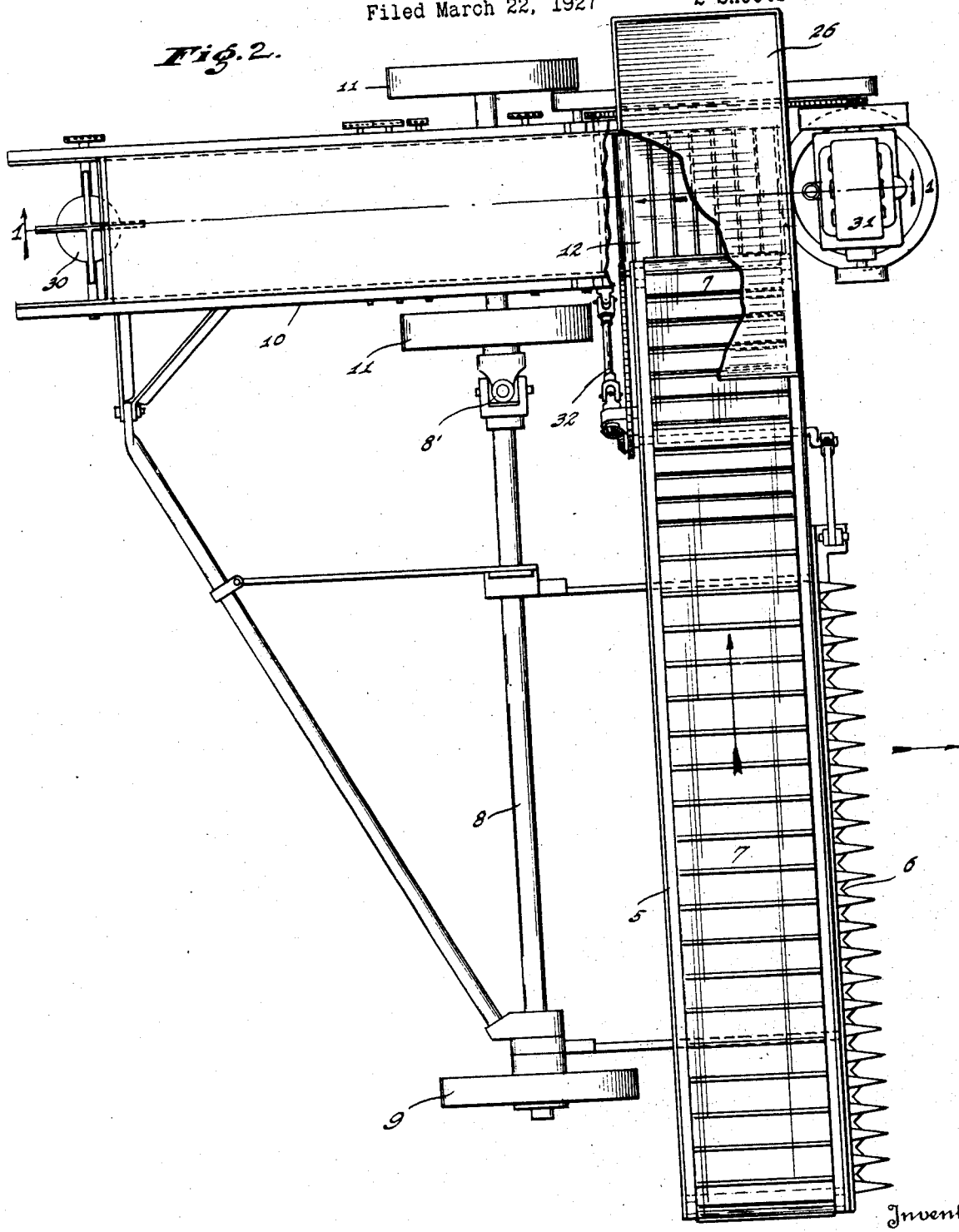

Patented Oct. 30, 1928.

1,689,443

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION COTTON HARVESTER.

Application filed March 22, 1927. Serial No. 177,409.

The object of my invention is to provide a combination machine for harvesting cotton, which in its travel and operation through the fields will cut and remove the cotton plants from the soil and convey the same to mechanisms to be separated so that the unopened bolls will be broken and the cotton released therefrom as well as from the ripened bolls, and the stems and débris with the cotton propelled through the machine, the cotton, however, being intercepted in its movement and selected from the remaining material by mechanism which also assists in removing such loose cotton from the machine to be discharged, and, if desired, the refuse material may be utilized as fertilizer during plowing operations, or otherwise disposed of.

In the accompanying drawings, forming part hereof, Figure 1 is a longitudinal sectional view of the separator forming part of my combination machine; and Fig. 2 is a plan of the complete machine.

In said drawings the portions marked 5 indicate a harvester, which may be of any suitable construction, and provided with a cutter, 6, conveyor, 7, and appropriate actuating mechanisms common to harvesters designed to cut and remove material. The harvester is preferably supported by an axle, 8, which may be pivotally, as at 8', or otherwise connected to the separator, and supported at its outer end by a wheel, 9.

The separator, 10, is mounted upon carrying wheels, 11, and in its forward end is provided with a feeding apron, 12, upon which material from the harvester is delivered by its draper or conveyer 7 in a well known manner, and is fed by the apron 12 to a cylinder or boll breaker, 14, having a concave, 15, associated therewith, which cylinder and concave may be of any appropriate constructions for breaking cotton bolls. As the material passes from the boll breaker 14 it is discharged upon a raddle carrier, 17, its downward movement from the boll breaker to said carrier being controlled by a beater, as 18, and adjacent the beater I may employ a deflector, 19, for checking and controlling the movement of the material.

The material being conveyed rearwardly by the carrier 17 travels across an air blast discharging from a fan, 20, through its outlet, 21, in an upward direction, so that the loose cotton forming part of the mass being propelled is separated therefrom and forced toward gathering instrumentalities, as the picker drum 22 and discharge picker 23, each of which is provided with teeth, 22' and 23', which seize the cotton and draw it between the drums, and as one of said elements, desirably the discharge picker 23, rotates at higher speed than its companion drum the effect is to constantly lead the cotton to a conductor, such as the canvas carrier 24, which movement of the cotton is accelerated and guided by a beater 25 or its equivalent to said carrier 24, which latter conveys the cotton to any suitable source of deposit, as a bin 26, from which the cotton may be removed as desired. While I have shown a bin for receiving the cotton I desire it to be understood that I may employ other means for final delivery of the separated cotton, such as an elevator or other conveyer for receiving the cotton and delivering it to vehicles as the machinery progresses through the fields. The raddle 17 travels over a screen floor, 17', which preferably extends from behind the boll breaker 14 to the end of the raddle, and as the moving material being carried by the raddle conveyer is to more or less extent agitated the dust and trash sifts through the screen to the ground. The fan 20 may be positioned in relation to the raddle as desired, and under some conditions I may dispense with it, as the loose fluffy cotton will be readily picked up by the toothed drums 22, 23, but by employing a blast or similar agency a more positive separation of the cotton from the moving mass of stems and leaves is accomplished. I may also employ a distributor, as a straw spreader, 30, for tossing and spreading the stems and leaves about the soil to be plowed under for fertilizer.

It will thus be seen that I provide a comparatively simple machine for effectively separating cotton from the plants and removing the same from the moving mass of material to be conveyed directly to vehicles or otherwise. The mechanisms embodied in said machine may be operated by power from a self-contained motor, as 31, or from a tractor (not shown) which draws the combined machine through the fields, or any other suitable actuating mechanisms; and which power is also utilized for actuating the harvester mechanisms by suitable connections with the separator element, such as a flexible power shaft, 32, or otherwise, in a well known manner.

What I claim is:

1. In a machine of the class described, a separator, means in the separator for breaking cotton bolls, means in the separator for conveying gathered cotton to the boll breaking means, means for conveying material from the boll breaking means through the separator, means for producing and discharging an air blast through the material in its travel to separate cotton therefrom, means intercepting the traveling material and gathering cotton lint therefrom, and means for conveying the cotton lint from the gathering means to a point of discharge.

2. In a machine of the class described, a separator, means in the saparator for breaking cotton bolls, means for conveying material to the boll breaking means, a conveyor for moving material rearwardly from the breaking means through the separator, a fan associated with said conveyor for separating cotton from the material carried thereby, mechanism for gathering said separated cotton, and means for receiving and conveying cotton from the gathering means.

3. In a machine of the class described, a separator, means in the separator for breaking cotton bolls, a traveling conveyor for moving material from said boll breaking means through the separator, means for pneumatically separating cotton from material on said conveyor, picking drums adjacent said conveyor for gathering the separated cotton, means for conveying cotton from the picking drums, and means for receiving cotton from said conveying means.

4. In a machine of the class described, a separator, a boll breaking cylinder in the separator, means for conveying material to said boll breaking cylinder, means for directing material downwardly as it leaves the cylinder, a raddle conveyor for receiving and conveying material from the separator, means for separating cotton from the material as it is being conveyed by the raddle, means for gathering the separated cotton, and means for receiving and conveying the cotton from the gathering means.

5. In a machine of the class described, a separator, means in the separator for breaking cotton bolls, means for conveying material from the boll breaking means, means for separating cotton from the material as it is being conveyed, rotary gathering mechanism for selecting and conveying the separated cotton, and means for receiving and conveying said cotton from the gathering mechanism.

6. In a machine of the class described, a separator, means in the separator for breaking cotton bolls, a screen adjacent the boll breaking means, an endless conveyor moving over said screen for carrying material from the boll breaking means and discharging the same from the separator, pneumatic means for separating cotton lint from the material during the movement of the latter on said conveyor, rotary means for gathering the cotton lint separated from said material, means for conveying the cotton gathered by the rotary means, and means for guiding the cotton to the latter conveying means.

7. In a machine of the class described, a separator, means in the separator for breaking cotton bolls, a screen adjacent the boll breaking means, an endless conveyor traveling about the screen for carrying material from the boll breaking means and discharging the same from the separator, pneumatic means for separating cotton lint from the material during the movement of the latter on the conveyor, and rotary pickers above the conveyor for gathering the lint separated by said pneumatic means and propelling the lint to a point of delivery.

In testimony whereof I affix my signature.

WALLACE F. MacGREGOR.